United States Patent [19]

Pokrzywa

[11] 4,200,128
[45] Apr. 29, 1980

[54] GAS VALVE LOCK

[76] Inventor: Alan S. Pokrzywa, 6750 W. 173rd St., Tinley Park, Ill. 60477

[21] Appl. No.: 922,350

[22] Filed: Jul. 6, 1978

[51] Int. Cl.² .................. F16K 35/06; G05G 5/06
[52] U.S. Cl. .................................. 141/392; 74/526; 251/90; 251/111; 251/284
[58] Field of Search ............... 141/209, 392, 206, 207, 141/208, 210–229, 1, 198; 251/90, 240, 101, 111, 284, 285; 74/526

[56] References Cited

U.S. PATENT DOCUMENTS

| | | | |
|---|---|---|---|
| 1,398,888 | 11/1921 | Cadigan | 251/90 |
| 1,709,594 | 4/1929 | Rosenberg | 251/90 |
| 3,285,564 | 11/1966 | Mansfield | 251/240 |
| 3,521,681 | 7/1970 | Wilson | 141/209 |
| 3,589,413 | 6/1971 | Vest | 251/284 |
| 3,603,359 | 9/1971 | Belue | 141/209 |
| 4,095,629 | 6/1978 | Jordan | 251/90 |
| 4,098,488 | 7/1978 | Forrest | 141/392 |

FOREIGN PATENT DOCUMENTS 667947  8/1963  Canada ..................... 141/209

*Primary Examiner*—Martin P. Schwadron
*Assistant Examiner*—G. L. Walton
*Attorney, Agent, or Firm*—Hill, Van Santen, Steadman, Chiara & Simpson

[57] ABSTRACT

A fuel valve actuator hold open lock is disclosed comprising a formed member insertable into an opening in a trigger guard in a gasoline pump delivery valve assembly, the member having longitudinally spaced apart abutment shoulders for engaging the valve actuating trigger.

5 Claims, 6 Drawing Figures

GAS VALVE LOCK

BACKGROUND OF THE INVENTION

1. Field of the Invention

This invention relates to valve trigger locks and more particularly to a gasoline delivery nozzle valve trigger engaging hold open device.

2. Prior Art

Most vehicle fuel delivery systems include a pump housing with a delivery hose extending therefrom. The hose terminates in a delivery valve assembly. The valve assembly includes a valve body having a connection to the hose adjacent one end and having a delivery spout projecting from the other end. The valve body encloses the valve and carries a trigger actuatable to open and close the valve. In standard delivery valves, the trigger is partially encircled by a trigger guard which, at a rear end of the trigger has an elongated opening therethrough. Normally a valve locking member is pivotably carried on the trigger guard and is pivotable into the opening. When in the opening, the trigger lock can engage the free end of the trigger in a number of positions thereby holding the trigger open. The valve is provided with an automatic shut off feature that disengages the trigger when the delivered fuel reaches a level in the fuel receptable approximately equal to the position of the filling spout within the receptable. At this point, the valve pressure on the trigger is released.

Recently, self-service fuel stations have become increasingly popular. In such self-service stations, the patron is expected to operate the gas delivery system on his own. In order to prevent gasoline spillage by inexperienced patrons, many fuel delivery systems have removed the trigger lock from the trigger guard. While this may present a desirable safety feature when the patron is inexperienced, it is a considerable aggravation to experienced patrons. This is particularly true during inclement weather when it may be necessary for an automobile driver to remain exposed to the elements for a considerable period of time in order to fuel his vehicle.

It would therefore be an advance in the art to provide a device utilizable by self-service station patrons to lock the delivery valve in an open position without maintaining patron contact with the delivery valve. However, such an advance in the art would provide safety problems if it were possible to use the device with delivery valve systems not equipped with an automatic valve shut off control of the above described type.

SUMMARY OF THE INVENTION

It is therefore a preliminary object of this invention to provide an easy to use, inexpensive, fuel delivery valve trigger hold open lock.

It is another, and more specific object of this invention to provide a fuel delivery valve hold open lock which is personal to the user of the fuel delivery system and which is designed for use only in association with valve delivery systems having automatic shut off features.

It is another, and more specific object of this invention to provide a fuel delivery valve trigger hold open lock which is dimensioned to be received in the opening of a trigger guard adjacent the free end of the trigger and which is configured to retain itself in that opening when in engagement with a trigger end but which is not otherwise fixed to the trigger guard.

These objects are achieved in the present invention which provides a formed elongated piece of substantially U-shaped cross section having a pair of upstanding side legs and a base bight section. The side legs terminate in spaced relation to the ends of the bight inwardly of the longitudinal ends thereof and are themselves provided with longitudinally spaced gaps. The bight may be holed at one end for attachment to a key chain or ring.

The device is dimensioned so as to be receivable in the opening or slot in the free trigger end associated portion of the trigger guard of standard automatic shut off gas dispensing valve assemblies. To this end, the space between the longitudinal ends of the upstanding sidewalls is dimensioned to closely approximate the longitudinal extent of the opening in the guard and the spacing between the sidewalls is dimensioned to closely approximate the width of the opening of the trigger guard.

When inserted in the trigger guard opening from the exterior thereof, the longitudinally spaced gaps of the sidewalls provide receipt areas for the free end of the trigger with the sidewall sections thereby providing longitudinally spaced ledge surfaces against which the trigger can be engaged thereby holding the trigger in a valve open position.

In one preferred embodiment illustrated herein, the device may be formed of machined metal whereas in another embodiment illustrated herein, the device may be formed as a stamped and bent piece of metal or, in either embodiment, of formed plastic or the like.

It is therefore a general object of this invention to provide a nonattached fuel dispensing hold open lock for use with standard service station fuel dispensing nozzle valve assemblies.

Other objects, features and advantages of the invention will be readily apparent from the following description of preferred embodiments thereof, taken in conjunction with the accompanying drawing, although variations and modifications may be effected without departing from the spirit and scope of the novel concepts of the disclosure, and in which:

DESCRIPTION OF THE PREFERRED EMBODIMENTS

Figure 1:
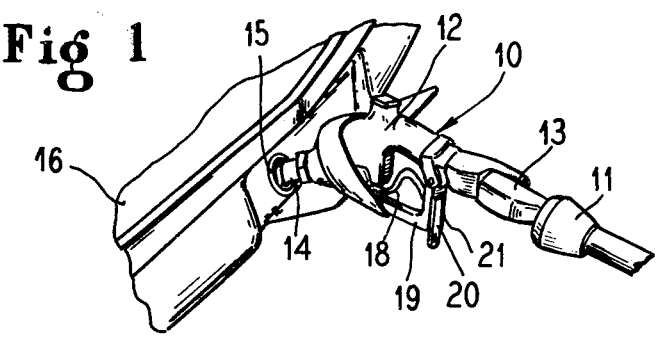
FIG. 1 is a fragmentary perspective view of a fuel dispensing nozzle valve of standard design positioned to dispense fuel to an automobile, the valve being equipped with the hold open lock of this invention.
Figure 3:
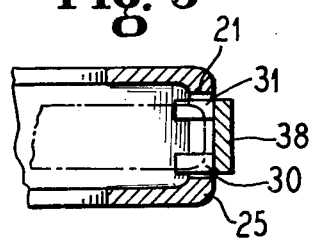
FIG. 3 is a fragmentary cross sectional view taken along the lines III—III of FIG. 2.

FIG. 1 illustrates a fuel delivery valve assembly 10 of the type commonly employed in gasoline stations. The assembly includes a supply hose 11 from a pump which is connected to the valve housing 12 through a joint 13. The valve housing 12 has on its opposite end, a delivery spout 14 which is illustrated as being placed in communication with the fuel tank inlet 15 of an automobile 16. A valve is disposed in the housing 12 and is actuatable by a trigger 18. A trigger guard 19 encloses the area of the trigger 18. A lock member 20 according to this invention is illustrated as being in position within a slot opening 21 of the trigger guard 19 holding the trigger 18 in a valve opening position.

Figure 2:
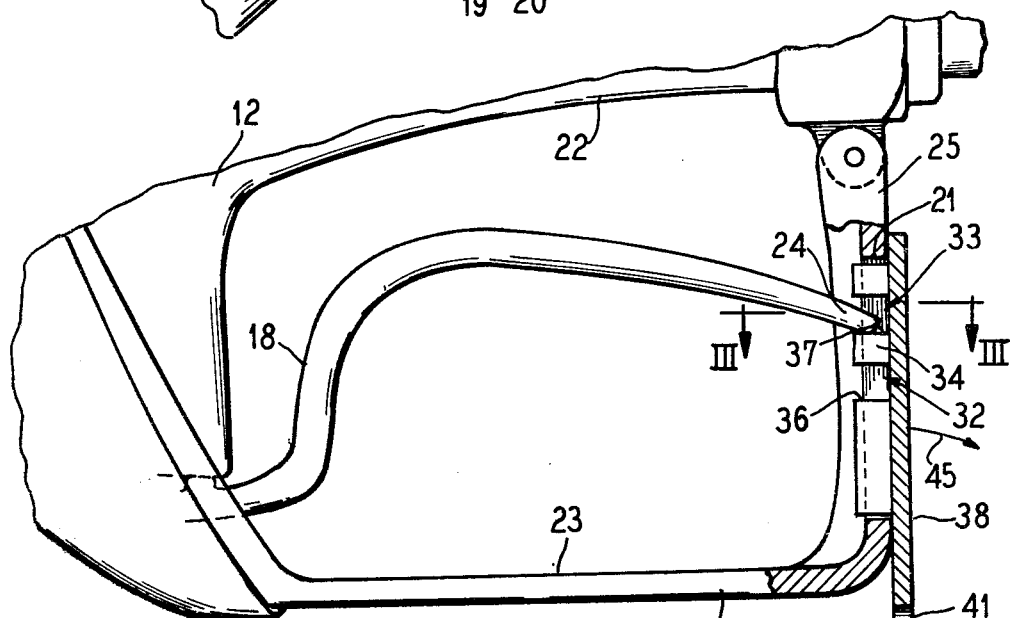
FIG. 2 is an enlarged fragmentary partially sectional view of the dispensing valve assembly and lock of this invention.

As best illustrated in FIG. 2, the valve housing 12 includes internally thereof a valve which is actuatable by movement of the trigger 18 to open the valve by movement of the trigger towards the valve body surface 22 and away from the trigger guard bottom 23. The trigger 18 terminates in a free end 24 received internally of the opening or slot 21 in the back wall 25 of the trigger guard 19.

In order to provide for continuous unattended pumping of fuel, all that is necessary is to maintain the free end 24 in a position spaced from its closed position and biased away from the trigger guard bottom 23.

To this end the lock 20 has spaced apart sidewalls 30 and 31 which fit into the slot 21 in the trigger guard. Side-walls 30 and 31 have an overall longitudinal length approximately slightly less than the overall length of the slot 21. Additionally the outside faces of the sidewalls 30 and 31 are spaced apart approximately slightly less than the width of the slot. In this manner the sidewalls 30 and 31 are easily insertable into the slot or opening 21. The sidewalls 30 and 31 are provided with at least two gaps 32 and 33 spaced by common sidewall portion 34. This provides ledges 36 and 37 against which the free end of the trigger 24 can engage.

Since, during delivery of fluid, the trigger is being biased downwardly by the valve, the engagement of the free end 24 with the ledge 36 or 37 will hold the trigger in a partially valve open position. The degree of valve opening will be determined by which ledge is engaged with the ledge 37 providing a faster flow of fuel than the ledge 36.

The sidewalls 30 and 31 are interconnected by a bight base section 38 which extends beyond both longitudinal ends of the sidewalls 31 and 32 so as to overlie portions of the trigger guard beyond the ends of the slot 21. This determines the depth of insertion of the lock into the slot or opening 21 thereby properly positioning the ledges. One end 40 of the bight 38 may extend considerably beyond the sidewalls and may be provided with an opening 41 for receipt of a key chain or key ring 42.

Preferably the sidewalls 30 and 31 are co-dimensioned with respect to the bight and to a standard slot or opening 21 size such that when the lock is inserted in the slot 21, it will not fall out of the slot by a rotating tilt action for example, in the direction of the arrow 45 due to engagement between the sidewalls and the ends of the slot. This means that, even upon release of the pressure from the trigger 18 by actuation of the automatic cut off, the lock will not normally fall out of the trigger guard slot.

Figure 4:
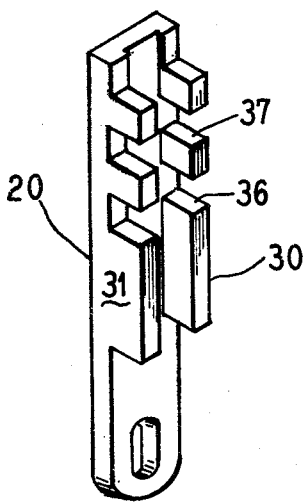
FIG. 4 is a perspective view of one embodiment of the lock of this invention.

FIG. 4 illustrates an embodiment of the lock 20 which may be formed of plastic or machined of metal such as, for example, aluminum. In this embodiment two ledges 36 and 37 are formed on the sidewalls 30 and 31.

Figure 5:
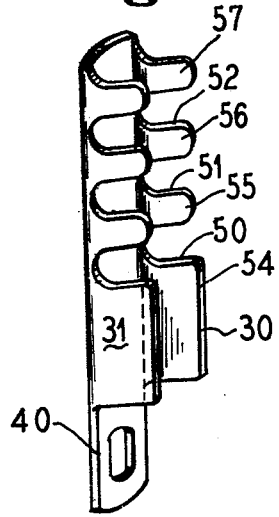
FIG. 5 is a perspective view of a second embodiment of the lock of this invention.
Figure 6:
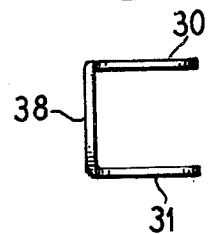
FIG. 6 is an end plan view of the embodiment of FIG. 5.

FIG. 5 illustrates another embodiment which may advantageously be formed of stamped and bent metal or, again, of molded plastic. In this embodiment three ledges 50, 51, and 52 are provided formed as radius bottomed gaps in the sidewalls 30 and 31. It is to be noted that, if desired, the longitudinal edges of the sidewalls 30 and 31 formed by the gaps providing the ledges as well as at the upper longitudinal end may be angled. The lands of the sidewalls 54 through 57, particularly as angled, as illustrated in FIG. 5 may then require a downwardly and inwardly pivoted insertion of the lock into the opening 21 which, particularly when coupled with the weight of a key ring on the extension 40 will assure that the lock will not fall out of the slot 21. Additionally, because the free end 24 of the trigger may be at an angle, the angulation of the ledges 50, 51, and 52 more securely contacts the trigger.

It can therefore be seen from the above that my invention provides a novel, patron utilizable fuel delivery valve hold open lock which is insertable in standard fuel valve trigger guards to maintain the trigger in a fuel delivery open position. Moreover my invention provides a plurality of flow rates for the fuel delivery system. Additionally since my invention is designed to be utilized only in connection with trigger guards which had heretofore been designed to be used in association with automatic cut off valves, an enhancing safety factor is provided since the lock is not utilizable in connection with delivery valves not provided with automatic cut off features.

Although the teachings of my invention have herein been discussed with reference to specific theories and embodiments, it is to be understood that these are by way of illustration only and that others may wish to utilize my invention in different designs or applications.

I claim as my invention:

1. A fuel valve hold open lock for use in association with trigger controlled fuel delivery valve assemblies equipped with trigger guards having slots therethrough adjacent a free end of a trigger comprising: a freely removable substantially U-shaped cross section elongated member having opposed spaced sidewalls interconnected by and projecting from a bight base, the sidewalls having a longitudinal length, the base having a longitudinal length greater than the length of the sidewalls and extending beyond longitudinal ends of the sidewalls, the sidewalls being dimensioned to have longitudinal lengths approximately equal to the longitudinal length of the trigger guard slots of standard fuel delivery valve assemblies, the sidewalls being spaced from one another so as to have an overall width substantially equal to the width of standard trigger guard slots, the sidewalls are insertable into said standard trigger guard slot, the sidewalls being segmented forming longitudinally spaced gaps, the gaps providing projecting ledges formed by sidewall segment edges extending away from said bight, the ledges dimensioned to engage the free end of the trigger when the sidewalls are inserted in a slot of the standard trigger to hold the trigger of a valve assembly at one of a plurality of fuel flow positions and means including the dimensioning of the sidewalls tending to retain the lock in the slots against accidential dislodgement there from.

2. The device of claim 1 wherein the bight has a longitudinal dimension greater than the length of trigger guard slot of standard fuel delivery valve assemblies whereby the bight is not insertable through the slot, the sidewalls being dimensioned to project from the bight a distance sufficient to allow engagement of the free end of the trigger with the ledges.

3. The device of claim 2 wherein the dimensions of the sidewalls and bight cooperate to maintain the lock in position in a fuel delivery valve trigger guard slot.

4. The device of claim 3 wherein the bight is extended at one longitudinal end of the sidewalls, the extended portion being provided with an opening therethrough for receipt of a key ring.

5. The device of claim 3 wherein the ledges are angled to a line perpendicular to the longitudinal extent of the bight.

* * * * *